UNITED STATES PATENT OFFICE.

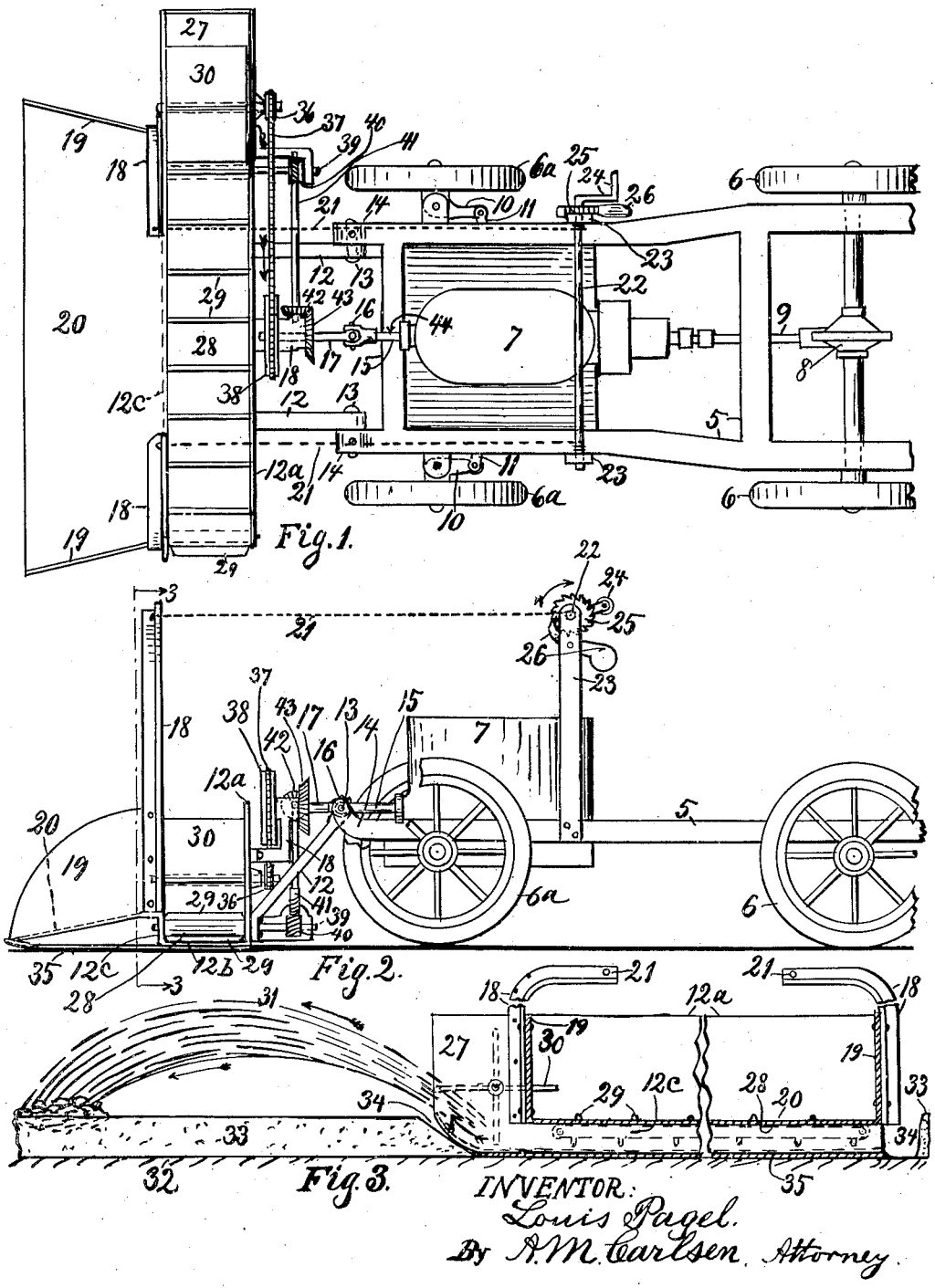

LOUIS PAGEL, OF STILLWATER, MINNESOTA.

SNOWPLOW.

1,407,947.  Specification of Letters Patent.  Patented Feb. 28, 1922.

Application filed September 27, 1920. Serial No. 413,037.

*To all whom it may concern:*

Be it known that I, LOUIS PAGEL, a citizen of the United States, residing at Stillwater, in the county of Washington and State of Minnesota, have invented a new and useful Snowplow, of which the following is a specification.

My invention relates to snow plows of the kind adapted to be pushed forward by an automobile or other motor or engine driven vehicle or car; and the object is to provide an improved device of the said kind and also to connect it to the driving car in an improved manner.

In the accompanying drawing:

Fig. 1 is a top or plan view of my improved snow plow and the main parts of the car pushing it. Fig. 2 is a side elevation of Fig. 1, with some parts omitted. Fig. 3 is a section on the line 3—3 in Fig. 2.

Referring to the drawing by reference numerals, 5 designates the frame, 6, 6ª, the regular ground wheels and 7 the engine of an automobile or similar motor driven car, of which 8 is the usual housing of the differential gear driven by the shaft extension 9 from the motor. The front wheels 6ª, are steered by the levers 10, links 11 and other means (not shown) of any suitable construction.

The frame work 12 of the snow plow is pivoted at 13 to the front arms 14 of the frame 5, and in direct line with said pivot joints the shaft 15 of the engine is connected by a universal joint 16 to a shaft 17, which is journaled in a bearing 18 fixed on the part 12ª of the plow frame 12, 12ª, 12ᵇ, 12ᶜ. The plow may thus be swung on the joints 14—16 and raised from the ground when being moved along idle.

Such raising and lowering is done by inwardly inclined or curved posts 18, fixed on the diverging sides 19 of a snow scoop 20 and provided with chains or cables 21, the rear ends of which are wound on a transverse shaft 22, journaled in posts 23 fixed on the car. Said shaft is provided with a crank 24 and a ratchet wheel 25, the latter engaged by a dog 26, by which the ratchet wheel may be held in any desired position and thus the plow raised or lowered.

The scoop has its bottom inclined upwardly toward the rear end of it and then offset downwardly as 12ᶜ, rearwardly as 12ᵇ, and upwardly as 12ª, to form also the frame of the plow and a lateral outlet or spout 27. Joining said spout is a transverse channel formed by the downward offset 12ᶜ, 12ᵇ. In said channel is arranged an endless conveyor 28, having cleats 29 by which to move the snow toward a fan or blower wheel 30, which ejects the snow as shown at 31 in Fig. 3. In said view 32 designates the ground and 33 the snow through which a path 34 is being plowed or formed. The sides 19 of the scoop are spread toward their front so as to make a path wider than the truck of the car. The scoop is preferably given a broad runner 35, to prevent the part 12ᶜ from engaging obstructions which may project up from the frozen ground below the snow.

The shaft of the fan 30 is provided with a sprocket wheel 36, driven by a link belt 37 from a larger sprocket 38 fixed on the shaft 17; and the roller 39 of the conveyor 28 is provided with a worm-gear 40 which is driven by a worm-screw 41 having a bevel gear 42 driven by a bevel gear 43 fixed on the shaft 17.

In the building and operation of the machine the manufacturer may modify the relative sizes of the gears and pulleys to fairly correspond to the greater or less snow fall in the territory where the machine is to be used; or the operator may exchange such gears of different sizes as may be furnished with each machine. A suitable clutch coupling (not shown) is arranged at the point 44 in Fig. 1 for stopping the operation of the plow when it is carried idle.

After the gearing is suitably regulated the car is driven forward into the snow so the snow gets upon the scoop and conveyor and is thus brought in contact with the fan, and the latter throws and blows it, as at 31, a considerable distance away from the road 34 which is thus formed by the plow.

What I claim is:

1. In a snow plow of the class described, having a wheel supported frame, a snow scoop with a flat bottom raised some with its rear edge, a transverse channel rearward of said edge, an endless conveyor in the channel, a spout at one end of the channel, a fan arranged to receive the snow from the conveyor and eject it through the spout, a motor on the wheeled frame, operative connection between the motor and the supporting wheels of the frame and operative connection between the motor and the conveyor and the fan.

2. The structure specified in claim 1, said snow plowing part of the machine being hinged at a horizontal axis to the front end of the wheeled frame, and the motor-driven shaft operating the conveyor and the fan having a universal joint in the line of said axis, and means for swinging the snow operating part of the machine up and down at said axial line, and means for holding the swung part of the machine in raised position when so desired.

3. The structure specified in claim 1, said scoop having upright side portions spaced farther apart with the front ends than the rear ends.

4. The structure specified in claim 1, said scoop having a broad runner or guarding plate to guard the front of the channel from engaging obstructions on the ground.

In testimony whereof I affix my signature.

LOUIS PAGEL.